United States Patent [19]

Friedland et al.

[11] 4,079,630
[45] Mar. 21, 1978

[54] ELLIPTICITY CONTROL SYSTEM FOR ANGULAR DISPLACEMENT SENSOR

[75] Inventors: Bernard Friedland, West Orange; Maurice Frank Hutton, Pompton Lakes, both of N.J.

[73] Assignee: The Singer Company, Little Falls, N.J.

[21] Appl. No.: 743,732

[22] Filed: Nov. 22, 1976

[51] Int. Cl.² ............................................. G01C 19/56
[52] U.S. Cl. .................................................... 73/505
[58] Field of Search .............. 73/505, DIG. 1; 74/5 R

[56] References Cited

U.S. PATENT DOCUMENTS

| | | | |
|---|---|---|---|
| 3,106,847 | 10/1963 | Mullins et al. .......................... | 73/505 |
| 3,354,724 | 11/1967 | Kabaian ................................. | 73/505 |

Primary Examiner—James J. Gill
Attorney, Agent, or Firm—L. A. Wright; T. W. Kennedy

[57] ABSTRACT

An ellipticity control system for controlling the elliptical deviation of the vibratory element of a displacement sensor. The apparatus incorporates a plurality of drive electrodes, at least six in number, mounted concentrically along the longitudinal axis of the elongated vibratory element. Each drive electrode is formed in pairs oriented along separate axes. A pair of X-axis pickoffs and a pair of Y-axis pickoffs axially spaced from the drive electrodes are also mounted concentrically of the vibratory element to sense the deviation of the vibratory element from null and to provide control signals by way of circuit means to the drive electrodes.

7 Claims, 4 Drawing Figures

ELLIPTICITY CONTROL SYSTEM FOR ANGULAR DISPLACEMENT SENSOR

This invention relates to an ellipticity control system for an angular displacement sensor. More particularly, this invention relates to an ellipticity control system having a multiplicity of drive means mounted concentrically of the vibrating element along multiple axes for controlling the ellipticity of the vibratory element.

BACKGROUND OF THE INVENTION

In U.S. Pat. No. 3,992,952 assigned to the same assignee as the present application, there is described a control system for an angular displacement sensor. The ellipticity control system in the above-mentioned patent requires active feedback of the position of a point on the vibrating member. In the present invention, the need for active feedback is eliminated because the required control forces proportional to position are provided by a multiple electrode configuration.

The principal disadvantage of the ellipticity control system described in the above-mentioned patent is that there may be errors in synthesizing forces proportional to position of the vibrating member for purpose of ellipticity control. Since there is no need in the present invention to synthesize forces proportional to position of the vibrating member, this source of error is eliminated.

BRIEF DESCRIPTION OF THE INVENTION

The present invention comprises an elongated vibratory member mounted at its ends on the wall of a casing. A plurality of drive electrodes, at least six in number, are mounted concentrically along the longitudinal axis of the vibrating element. The drive electrodes are formed in pairs along separate axes. In this manner, they are employed to force the elliptical deviation of the vibratory element into a desired amplitude pattern while reducing the elliptical deviaton to zero. A pair of X-axis pickoffs and a pair of Y-axis pickoffs spaced axially from the drive electrodes are also mounted concentrically of the vibratory member to sense the deviation of the vibrating element from null and to provide control signals by way of appropriate circuits for the drive means.

Accordingly, it is an object of this invention to provide an ellipticity control system that does not require active sensing and feedback of the position of the vibrating element and hence, the drift due to errors in sensing position is eliminated.

These and other objects and advantages of the invention will be more readily understood by those skilled in the art after a detailed consideration of the following specification taken in conjunction with the accompanying drawings wherein.

Figure 1:
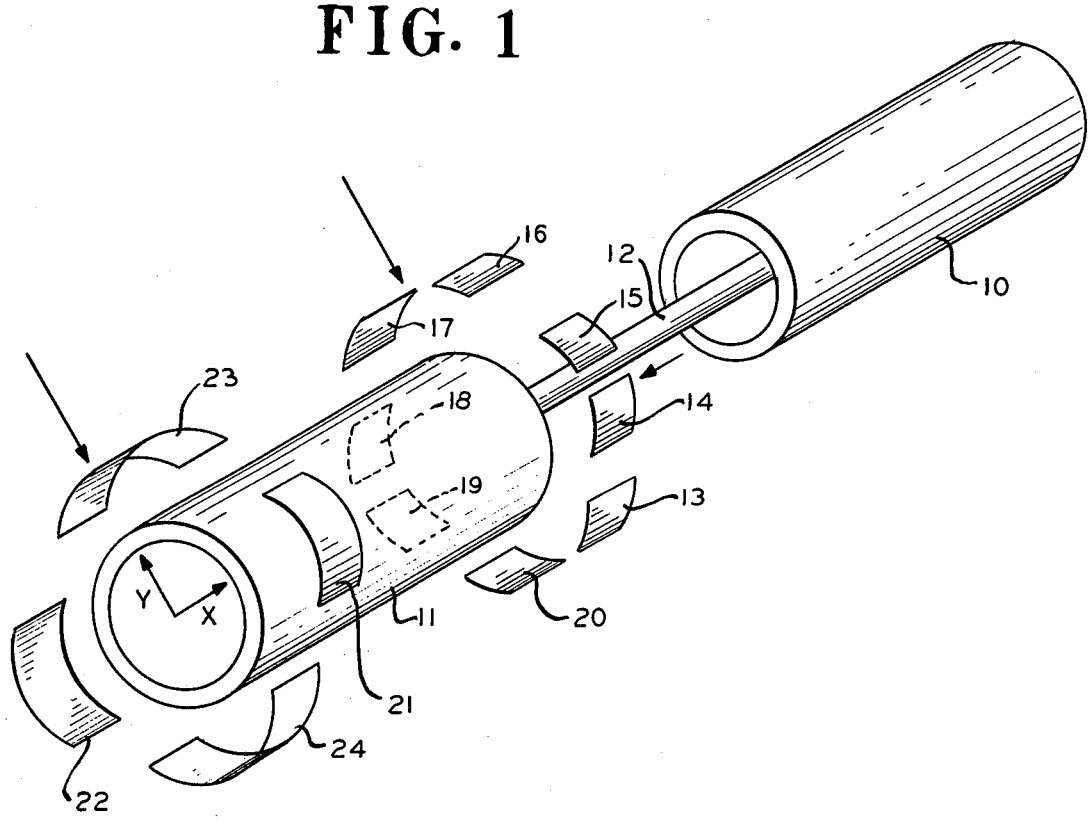
FIG. 1 is perspective view of an elongated vibratory element supported in its casing and suitable for use in the invention.

Referring to FIG. 1, a schematic perspective view of the invention is shown. The instrument includes a first end piece 10 and second end piece 11. An elongated vibratory element 12 is attached at its outboard ends to end pieces 10 and 11. The vibratory element 12 may be in the form of a rod or string supported by the end pieces. The end pieces 10 and 11 are themselves mounted in a suitable casing or housing (not shown).

Intermediate of the vibratory element, there are mounted eight capacitive drive electrodes 13 through 20. Each of the drive electrodes 13 through 20 are paired with the electrode which is diametrically opposite to it. For example, electrode 13 is paired with electrode 17; electrode 14 is paired with electrode 18, etc. When a voltage is applied to a pair of electrodes, it produces an electrostatic force on the vibratory element so as to drive it linearly and reciprocally along the axial plane of the electrode pair. That is, the force exerted by the drive electrode pairs is perpendicular to the axial plane of the vibratory element. In this instance, there are four pairs creating four axes. The present invention is not limited to the number of electrodes described. However, for proper operation, at least six electrodes must be employed to achieve the benefits of the invention. Accordingly, when appropriate voltages are impressed on each of the drive electrodes, the vibrating element 12 will be forced to maintain a vibrating amplitude with zero ellipticity.

Also shown in FIG. 1 are a first pair of capacitive pickoff electrodes 21 and 22, which are positioned diametrically opposite to each other on opposite sides of the vibratory element 12, and which are displaced longitudinally along the vibratory element from the drive electrodes to sense linear movement of the center of the axis of the vibratory element along the X-axis. A second pair of capacitive pickoff electrodes 23 and 24 are likewise positioned diametrically opposite from each other on opposite sides of vibratory element 12 to sense linear movements of the center of the axis of the vibratory element along the Y-axis. In the instant case, the X-axis and Y-axis are orthogonal to each other.

Figure 2:
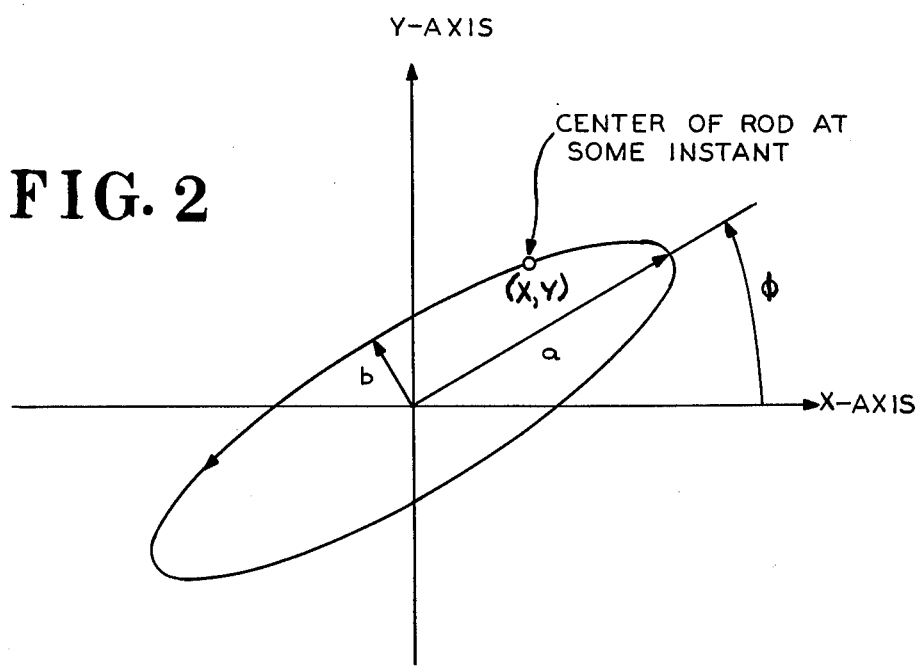
FIG. 2 is a graphical representation of the normal uncompensated orbit of a vibrating element.
Figure 3:
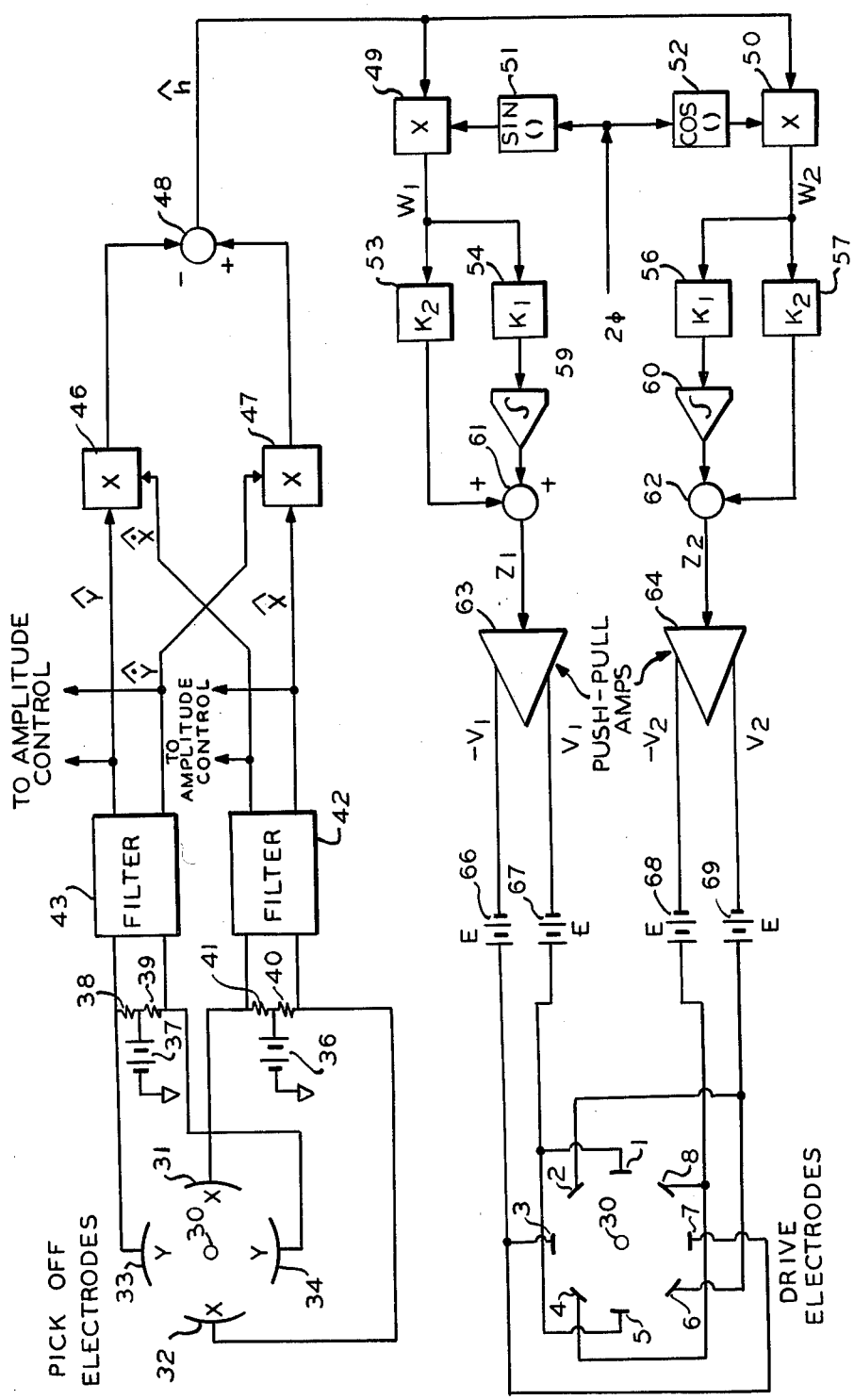
FIG. 3 is a schematic block diagram of the electronic circuit for providing ellipticity control to the drive means of the invention.

Referring to FIGS. 2 and 3, the control system of the invention consists of a set of pickoff electrodes 31, 32, 33, and 34, mounted concentrically of rod 30. Pickoff electrodes 31 and 32 on the X-axis are connected to voltage source 36 and pickoff electrodes 33 and 34 on the Y-axis are connected to voltage source 37. Capacitive changes between pickoff electrodes 31 and 32 and vibrating element 30 result in voltage drops on resistor 40 and 41, which represent the input signal to filter 42. Likewise, capacitive changes in pickoff electrodes 33 and 34 and vibrating element 30 result in voltage drops on resistors 38 and 39, which represent the input signal to filter 43. The output of filter 42 is the signal $\hat{X}$ and $\dot{\hat{X}}$ and the output of filter 43 is the signal $\hat{Y}$ and $\dot{\hat{Y}}$. Outputs $\hat{X}$, $\hat{Y}$ are estimates of the position components and outputs $\dot{\hat{X}}$ and $\dot{\hat{Y}}$ are estimates of the velocity of a point on the vibrating element (shown in FIG. 2) the orbit of which is to be controlled. From these outputs, an "angular momentum" signal, $$\tilde{h} = \dot{\hat{X}}\hat{Y} - \hat{X}\dot{\hat{Y}},$$

which is proportional to the ellipticity, is generated in multipliers 46 and 47. The signal $\tilde{h}$, from summing network 48 is multiplied by a signal representing $\sin 2\phi$ in multiplier 49 to obtain a signal $W_1$. The ellipticity signal $\tilde{h}$ is also multiplied by a signal representing $\cos 2\phi$ in multiplier 50 to obtain a signal $W_2$. The angle $\phi$ is the readout angle of the gyro and is applied to multiplier 49 by way of sine signal means 51 and to multiplier 50 by way of cosine signal means 52. The methods of obtaining $\sin2\phi$ and $\cos2\phi$ are well-known in the art. The signals $W_1$ and $W_2$ are each processed by amplification through amplifiers 53 and 57 respectively. The signals are also processed through integrators 59 and 60 by way of amplifiers 54 and 56 respectively. The output signals $Z_1$, and $Z_2$ from integrators 59 and 60 are given by:

$$Z_1 = K_2W_1 + K_1 \int W_1 dt$$
$$Z_2 = K_2W_2 + K_1 \int W_2 dt.$$

The signals $Z_1$ from summing network 61 and $Z_2$ from summing network 62 are applied as inputs to push-pull amplifiers 63 and 64 respectively. These amplifiers have a gain G so that each produces two outputs which are equal in magnitude an opposite in sign. Specifically, the outputs from amplifier 63 are $V_1$, $-V_1$ and the outputs from amplifier 64 are $V_2$, $-V_2$. These four output signals of the push-pull amplifiers 63, 64 are each placed in series with a constant voltage source (or battery) of voltages E and the resulting voltages are connected to the eight drive electrodes. Specifically, voltage source 66 is connected between $-V_1$ and drive electrodes 3 and 7. Voltage source 67 is connected between $V_1$ and drive electrodes 1 and 5. Voltage source 68 is connected between $-V_2$ and drive electrodes 4 and 8. Lastly, voltage source 69 is connected between $V_2$ and electrodes 2 and 6.

A detailed analysis of the electrostatics of the eight electrode configuration shows that the electrostatic forces produced on vibrating member 30 are given by $$-f_x = \frac{4CE}{g_0^2}(V_1 x + V_2 y) \quad (1)$$
$$-f_y = \frac{4CE}{g_0^2}(-V_1 y + V_2 x)$$

where
$\overline{f}$ is the electrostatic force in the $x$ direction, defined as being along a line normal to one pair of electrodes
$\overline{f}$ is the electrostatic force in the $y$ direction, normal to the $x$ direction
C is the capacitance of the capacitor consisting of one electrode and the vibrating element in its centered position
g is the distance between the electrode and the vibratory element in its centered position
E is the fixed voltage
V is the output of the push-pull amplifier is the natural frequency of the vibrating member in the absence of losses.
$\overline{q}$ is the equilibrium value reached by $q$. $q_2 = \overline{q}_2$ are convenient variables.
$a_0$ = starting value of major axis. $s$ = complex frequency.

$sI$ is the 4 × 4 identity matrix.
By the manner in which the control system is connected, shown in FIG. 1, $$V_1 = G(K_2 \hat{h} \sin2\phi + K_1 \int \hat{h} \sin2\phi \, dt) \quad (2)$$
$$V_2 = G(K_2 \hat{h} \cos2\phi + K_1 \int \hat{h} \cos2\phi \, dt)$$

The electrostatic forces produced are given by the relations resulting from substitution of (2) into (1).

A detailed mathematical analysis shows that with electrostatic forces given by (1) and (2), the minor axis $b$ satisfies the differential equation $$\ddot{b} = +\frac{a_0^2}{2}K_2 \dot{b} + \frac{a_0^2}{2}(-q_1\sin2\phi + q_2\cos2\phi)$$

where
$\dot{q}_1$ and $\dot{q}_2$ are given by $$\dot{q}_1 = K_1 a_0 b \sin2\phi \quad (3)$$
$$\dot{q}_2 = K_1 a_0 b \cos2\phi$$
$$\dot{\phi} = \frac{a_0 b}{\Omega(a_0^2 - b^2)}[q_1\cos2\phi + q_2\sin2\phi].$$

This system reaches equilibrium for $$b = 0; q_1 = \overline{q}_1 = \text{const}; q_2 = \overline{q}_2 = \text{const} \quad (4)$$
with $\overline{q}_1\sin2\phi + \overline{q}_2\cos2\phi = 0.$ The stability is determined by $$|sI - A| = 0$$

Where A is the (4 × 4) Jacobian matrix corresponding to (3) and is given by $$A = \begin{bmatrix} -\frac{a_0^2}{2}K_2 & -\frac{a_0}{2}\sin2\phi & \frac{a_0}{2}\cos2\phi & a_0 - \overline{q}_1\cos2\phi - \overline{q}_2\sin2\phi \\ K_1 a_0 \sin2\phi & 0 & 0 & 0 \\ -K_1 a_0 \cos2\phi & 0 & 0 & 0 \\ \frac{\overline{q}_1\cos2\phi + \overline{q}_2\sin2\phi}{\Omega a_0} & 0 & 0 & 0 \end{bmatrix}$$

The characteristic equation corresponding to this matrix is given by $$|sI - A| = s^2 + K_2\frac{a_0^2}{2}s + \frac{K_1 a_0^2}{2} + (\overline{q}_1\cos2\phi - \overline{q}_2\sin2\phi)^2 = 0. \quad (5)$$

The coefficients of the characteristic equation are all positive for $K_2>0$ and $K_1>0$ so the system is stable for all positive gains.

Figure 4:
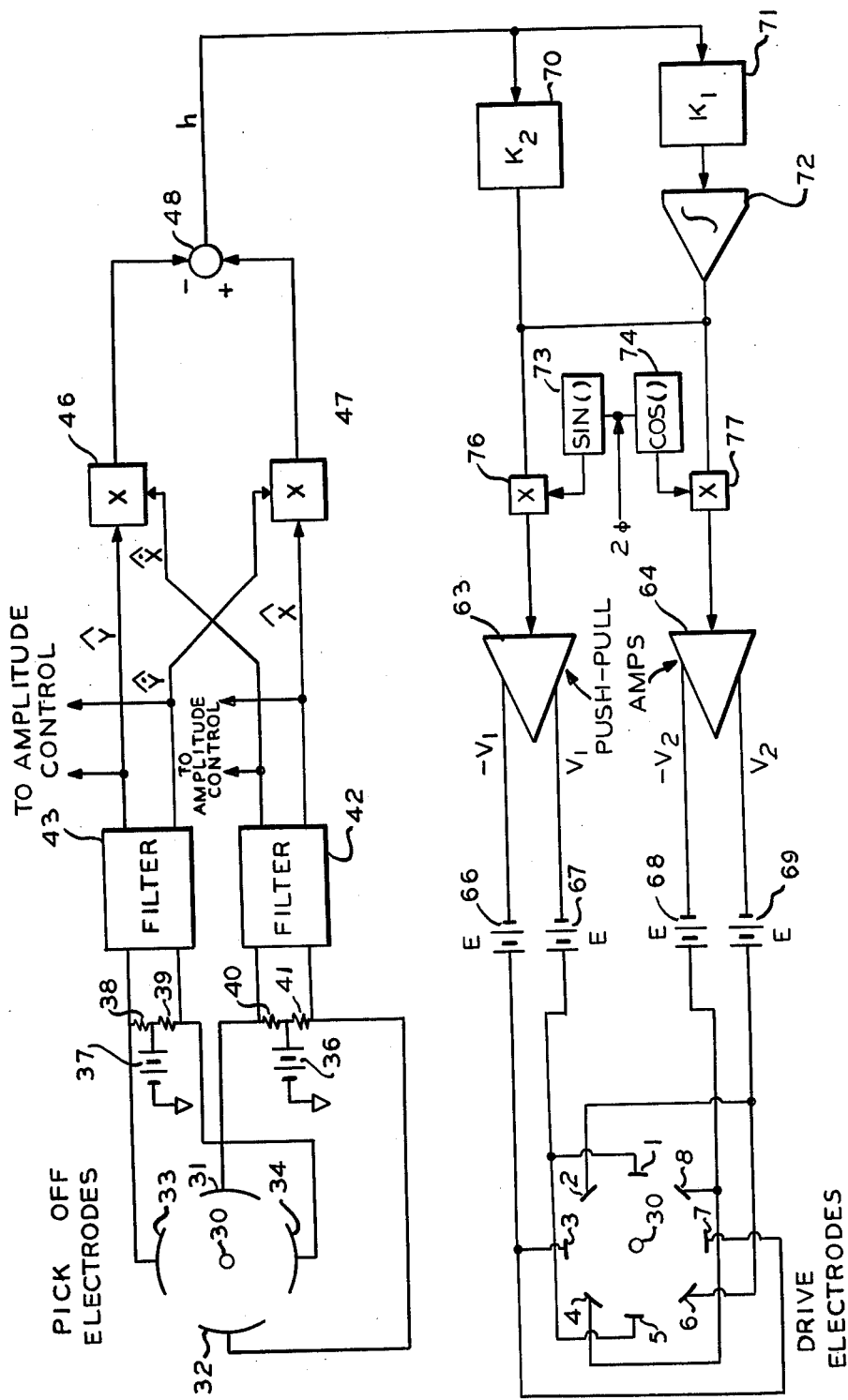
FIG. 4 is a schematic block diagram showing an alternate circuit arrangement for providing ellipticity control to the drive means.

Referring to FIG. 4, by reversing the trigonometric operations and the integration operations, the system can be constructed using only one integrator. The system shown in the block diagram of FIG. 4 operates essentially the same way as the system described with regard to FIG. 3.

Although a particular embodiment of the apparatus of the invention has been shown and described, modifications may be made. It is intended in the claims to cover the modifications which come within the spirit and scope of the invention.

What is claimed is:

1. A gyroscopic device having a vibratory element for determining angular displacement comprising:
   a housing,
   an elongated flexible vibrating element secured at both ends in said housing, and
   multiple pairs of drive means mounted along at least three axes concentrically of said vibrating element at a point intermediate the ends of said vibrating element for creating drive forces perpendicular to the axial plane of said vibrating element to force said vibrating element to a predetermined non-elliptical amplitude plane.

2. The gyroscopic device of claim 1 comprising:
   a plurality of drive means each separated from the other along axes of 45°.

3. The gyroscopic device of claim 2 comprising:
   four pairs of drive means each pair of drive means mounted along a separate axis relative to said vibrating element and each of said axes separated from the axis of another pair by an angle of 45° whereby said vibratory element is maintained in a predetermined non-elliptical amplitude plane.

4. In a gyroscopic device having a vibratory element for determining angular displacement a sensor means for controlling the elliptical distortion of said device comprising:
   a casing,
   a vibrating element secured at both remote ends in said casing,
   first drive means mounted concentrically of said vibrating element at a point intermediate the ends thereof and responsive to electric drive signals for creating drive forces toward the center of said vibrating element along a first axis traversing the longitudinal axis of the vibrating element,
   second, third and fourth drive means mounted concentrically of said vibrating element at the intermediate point thereof and responsive to said vibrating element for producing drive forces toward the center of said vibrating element along second, third and fourth axes traversing the longitudinal axis of the vibrator element,
   first pickoff means axially displaced from said drive means mounted concentrically of said vibrating element for sensing linear motion of the center of said vibratory element along a first axis and for producing pickoff signals corresponding thereto,
   second pickoff means axially displaced from said drive means mounted concentrically of said vibrating element for sensing linear motion of the center thereof along a second axis for producing pickoff signals corresponding thereto, and
   means connected to said pickoff means and responsive thereto for producing signals for said drive means whereby the amplitude of vibration of said vibrating element is maintained essentially constant and the ellipticity of said vibrating element is forced to zero.

5. The gyroscopic device of claim 4 having drive means comprising:
   a first pair of electrodes mounted concentrically of said vibrating means, along said first axis,
   a second pair of electrodes mounted concentrically of said vibrating means along said second axis,
   a third pair of electrodes mounted concentrically of said vibrating means along said third axis, and
   a fourth pair of electrodes mounted concentrically of said vibrating element along said fourth axis each of said axes connecting said pairs of electrodes being separated 45° from each other.

6. A system for controlling the elliptical deviation of a displacement sensor comprising:
   a casing,
   an elongated flexible vibrating element secured at both its remote ends to said casing,
   a first pair of pickoff electrodes mounted diametrically opposite from each other and concentrically of said vibrating element,
   a second pair of pickoff electrodes mounted diametrically opposite from each other and concentrically of said vibrating element the axis of said second pair of pickoff electrodes being displaced 90° from the axis of said first pair of pickoff electrodes both said first and second pair of electrodes being in capacitive with said vibrating element,
   means for deriving signals representative of the change in capacitance between said first and second pickoff electrodes and said vibrating element,
   means responsive to said deriving capacitance signal means for generating signals representative of position and velocity components of said vibrating element,
   means responsive to said position and velocity signals for generating a signal representing the angular momentum of said vibrating element,
   means for multiplying said anuglar momentum signal with sine and cosine angle signals derived from the system output,
   means responsive to said multiplying means for amplifying and integrating the output signals from said multiplying means,
   means responsive to said amplifying and integrating means for deriving opposite polarity voltage signals,
   first, second, third and fourth voltage sources,
   eight drive electrodes mounted concentrically around said vibrating element and separated 45° from each other each electrode separated 180° from another forming an electrode pair said first voltage source being connected to the third and seventh electrodes said second voltage source being connected to the fourth and eighth electrodes, and
   said fourth voltage source being connected to the second and sixth electrodes said drive electrodes creating forces on said vibrating element whereby the amplitude of vibration of said vibrating element is maintained essentially constant and the ellipticity of said vibrating element is forced to zero.

7. A system for controlling the elliptical deviation of a displacement sensor comprising:
   a casing,
   an elongated vibrating element secured at both its remote ends to said casing,
   a first pair of pickoff electrodes mounted diametrically opposite from each other and concentrically of said vibrating element,
   a second pair of pickoff electrodes mounted diametrically opposite from each other and concentrically of said vibrating element the axis of said second pair of pickoff electrodes being displaced 90° from the axis of said first pair of pickoff electrodes both said first and second pair of electrodes being in capacitive with said vibrating element, means for deriving signals representative of the change in capacitance between said first and second pickoff electrodes and said vibrating element, means responsive to said deriving capacitance signal means for generating signals representative of position and velocity components of said vibrating element, means responsive to said position and velocity signals for generating a signal representing the angular momentum of said vibrating element, means responsive to said angular momentum signal means for amplifying and integrating the output signal from said angular momentum signal means, means responsive to said amplifying and integrating means for multiplying the output signals of said amplifying and integrating means with sine and cosine signals derived from the system output, means responsive to said multiplying means for deriving opposite voltage polarity signals, first, second, third and fourth voltage sources, eight drive electrodes mounted concentrically around said vibrating element and separated 45° from each other each electrode separated 180° from another forming an electrode pair said first voltage source being connected to the third and seventh electrodes said second voltage source being connected to the first and fifth electrodes said third voltage source being connected to the fourth and eighth electrodes, and said fourth voltage source being connected to the second and sixth electrodes said drive electrodes creating forces on said vibrating element whereby the amplitude of vibration of said vibrating element is maintained essentially constant and the ellipticity of said vibrating element is forced to zero.

* * * * *